May 26, 1964 N. E. CHASEK 3,134,855

PULSE COMMUNICATION SYSTEM

Filed Oct. 7, 1960 3 Sheets-Sheet 1

INVENTOR
N. E. CHASEK
BY [signature]
ATTORNEY

PULSE COMMUNICATION SYSTEM

Filed Oct. 7, 1960 3 Sheets-Sheet 2

$\frac{A_1(t)}{2}\cos\theta + \frac{A_2(t)}{2}\sin\theta$ $-\frac{A_1(t)}{2}\sin\theta + \frac{A_2(t)}{2}\cos\theta$ $A(t)\sin\theta$ INVENTOR
N. E. CHASEK
BY E. W. Adams Jr.
ATTORNEY May 26, 1964 N. E. CHASEK 3,134,855

PULSE COMMUNICATION SYSTEM

Filed Oct. 7, 1960 3 Sheets-Sheet 3

INVENTOR
N. E. CHASEK
BY [signature]
ATTORNEY

United States Patent Office 3,134,855
Patented May 26, 1964

1 2

3,134,855

PULSE COMMUNICATION SYSTEM

Norman E. Chasek, Colts Neck, N.J., assignor to Bell Telephone Laboratories, Incorporated, New York, N.Y., a corporation of New York Filed Oct. 7, 1960, Ser. No. 61,239
7 Claims. (Cl. 179—15)

Figure 1A:
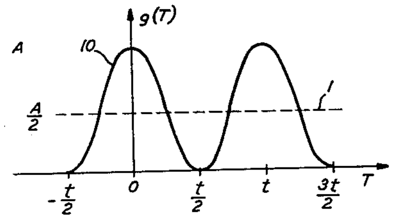

This invention relates to communications systems employing modulated carriers and more particularly to the multiplexing of pulse signals in suppressed-carrier systems.

The use of pulses to transmit information of all types is becoming increasingly prevalent. Pulse-code modulation, for example, is used for the transmission of quantized data which may subsequently be decoded and take the form of understandable speech. The manner in which such pulse information is transmitted depends, among other considerations, upon the power, bandwidth, and transmission time available. Common techniques include amplitude and frequency modulation, the former including double sideband and single sideband, with or without carrier suppression.

The system according to the present invention uses double sideband, suppressed-carrier amplitude modulation having two signals multiplexed in phase quadrature. This method of transmission has been found advantageous because suppressed-carrier amplitude modulation requires six db less peak power than standard amplitude modulation. Further, by employing phase-quadrature multiplexing, the spectrum efficiency is improved by 100 percent over double sideband amplitude modulation and in practice by 10 to 20 percent over single sideband amplitude modulation.

As is well known, signals which have been phase-quadrature multiplexed upon a carrier may be recovered by product modulation with either the carrier or a resupplied carrier in the event of suppressed-carrier transmission. In order to demodulate with optimum results, the carrier frequency used must have the same phase relationship with respect to the signals as the original modulated carrier.

An object of the present invention is to provide means for effectively and efficiently generating a local carrier of frequency identical to that of the suppressed carrier and having the proper phase relationship to the signals.

Another object of the present invention is to provide an efficient transmission system employing phase-quadrature multiplexing of signals comprising trains of pulses.

As explained hereinafter, the radio frequency spectrum of a random binary pulse train can be shaped to provide a zero or substantial zero in power density at $$\pm\frac{2}{t}$$

cycles per second from the spectrum center, where $t$ is a pulse width. In view of this fact, this frequency is an excellent portion of the band of a communication channel for transmitting a signal from which the exact carrier frequency may be derived. For pulses such as contemplated, $$\pm\frac{2}{t}$$

is equivalent to twice the pulse repetition rate of the signal pulse trains. Because a component of the pulse repetition rate can easily be recovered from an input signal, this component may be extracted and used to create a locking source for a generator nominally operating at twice the pulse repetition rate. The output of such a generator may then be employed to demodulate the aforementioned signal transmitted at the carrier frequency shifted by twice the pulse repetition rate and thereby extract the true carrier frequency.

For proper demodulation, the phase of the reconstructed carrier must also be exact. Because two signals will be multiplexed on the carrier, each displaced from the other by 90 degrees, the angular error in phase may be obtained by simultaneously introducing a reference pulse into each channel or signal at the transmitter. Upon reception and demodulation, the amplitudes of these pulses may be compared. As described hereinafter, the difference in amplitude is proportional to the phase error and, therefore, it may be used to control the phase of the aforementioned oscillator.

A feature of the invention resides in means for the transmission and reception of carrier information in conjunction with multiplexed signals, the carrier information being a signal having frequency equal to the carrier frequency shifted by a multiple of the pulse repetition rate of the multiplexed signals. From another aspect, the invention features means for transmitting carrier frequency information without appreciably increasing the bandwidth or power dissipation.

Another feature of the present invention resides in means for resupplying the exact carrier frequency for suppressed-carrier reception controlled by the signal repetition rate of the received signal.

Still another feature of the invention relates to means for extracting information concerning the phase of the received signals with respect to the carrier, such means interpreting pulses simultaneously inserted into each channel at the transmitter, the information after extraction being used to control the phase relationship of the resupplied carrier to the incoming signal.

The invention is here described as embodied in a transmission system for pulse-code-modulation signals wherein two broad-band channels are transmitted independently as quadrature double sideband, suppressed-carrier signals. At the transmitter, auxiliary information is produced for use at the receiver in the control of the local carrier resupply source. A sample of the original carrier is shifted by a frequency equal to twice the pulse repetition rate and the coded signal pulse trains are identically interrupted or pulsed at a reference frequency. At the receiver a local oscillator nominally operating at twice the pulse repetition rate is locked to the demodulated outputs and provides a signal which is used o convert the transmitted suppressed carrier sample to the true carrier frequency for demodulation. The proper phase of the resupplied carrier is determined by sampling the demodulated reference pulses at the reference pulse repetition rate, the difference in their amplitude being used to control the phase of the local oscillator.

Although the invention is embodied in a double sideband system it is understood that with modifications that are within the capabilities of one skilled in the art, it may also be used to advantage in a vestigial sideband system. A suitable arrangement, for example, might include the introduction of a filter at the transmitter having a linear response across the transmission band and a response of zero at a frequency removed from the carrier frequency by an amount equal to the pulse repetition rate.

Figure 1B:
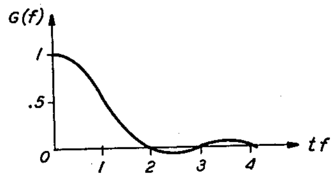
Figure 3:
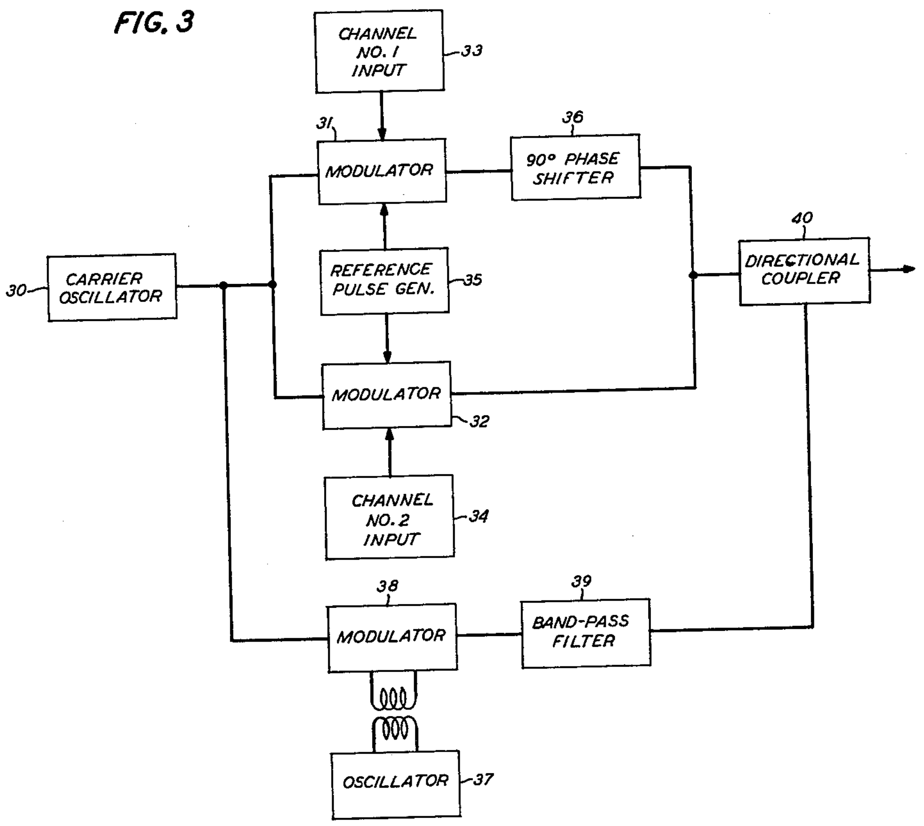
Figure 2A:
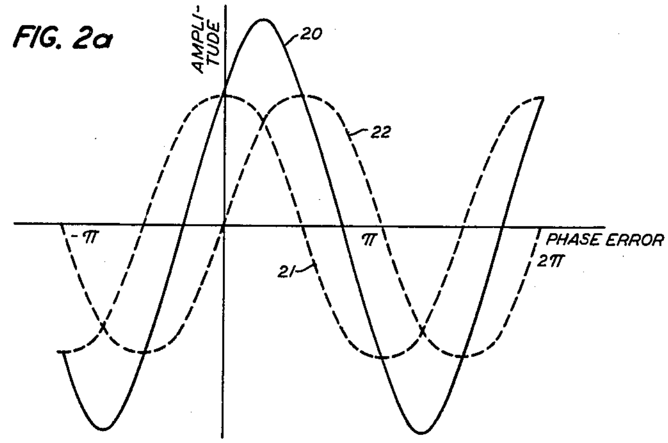
Figure 2B:
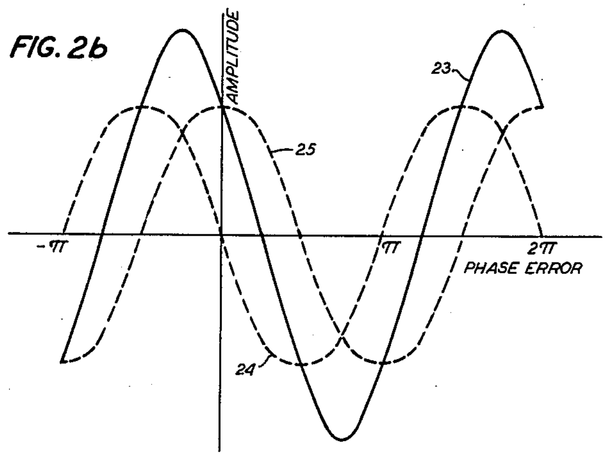
Figure 2C:
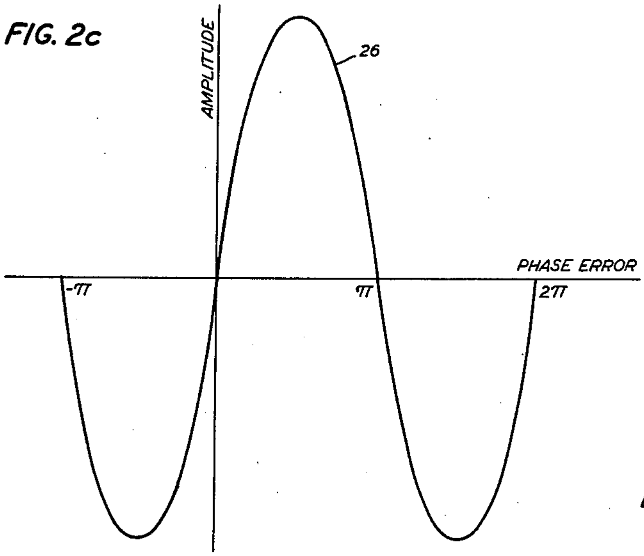
Figure 4:
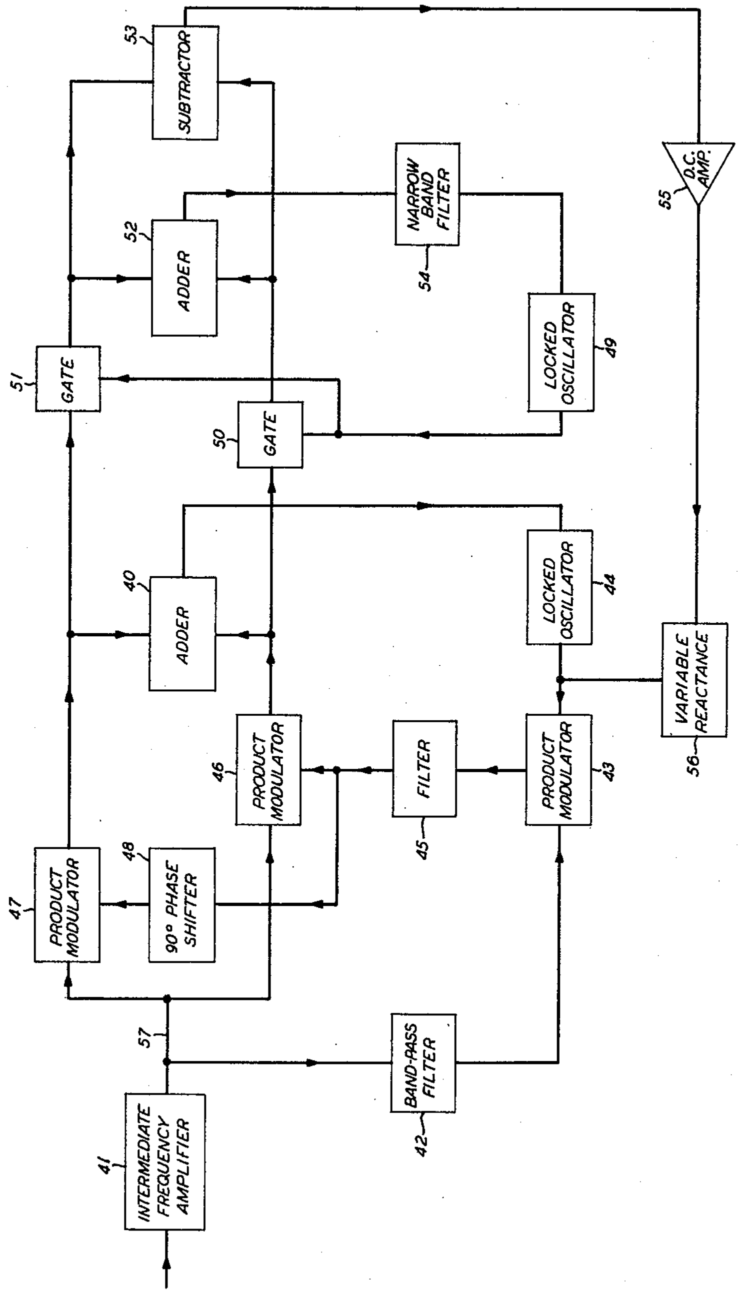

The above-mentioned objects and features, in addition to others, will be more fully understood in conjunction with the following description and drawings wherein:

FIG. 1*a* illustrates pulses of the nature comprising the signal trains employed in an illustrative embodiment of the invention;

FIG. 1*b* is a graphical representation of the frequency spectrum of such pulses;

FIGS. 2*a* through 2*c* illustrate waveforms of the demodulated signal outputs;

FIG. 3 is a block diagram representation of means for generating signals of the nature contemplated in an embodiment of the invention; and FIG. 4 is a block diagram representation of the receiver elements employed in an embodiment of this invention.

An analysis of the principles employed to develop the invention will yield a better appreciation of the following detailed consideration of the elements used. Two features distinguish the present system fundamentally from those previously encountered, namely, the transmission of a discrete carrier information signal at a frequency either above or below the carrier by a multiple of the pulse repetition rate, and the generation of a phase error signal composed of the relative amplitudes of signals present in each channel and specifically inserted for this purpose.

The reason for the selection of a frequency removed from the carrier by twice the pulse repetition rate may be understood by considering FIG. 1. FIG. 1*a* illustrates a train of pulses of the nature normally used in pulse transmission systems. It will be noted that if pulse-code modulation is involved, a pulse would be considered present if its time position or time slot were occupied by a signal of amplitude $A/2$, or greater. Each pulse is shown to have a waveform basically as represented, for example, by pulse 10 which is generated in accordance with the formula $$g(T)=A\cos^2\left(\pi\frac{T}{t}\right)\text{ for }-\frac{t}{2}<T<\frac{t}{2}$$

where $A$=peak amplitude
$T$=time
$t$=pulse width

The frequency spectrum of this pulse is represented by its transfer function illustrated in FIG. 1*b*. It will be noted that the power density equals zero at $tf=2$, $f$ being the frequency. Therefore, at $$f=\frac{2}{t}$$

there is no signal information present. Referring again to FIG. 1*a*, it is evident that the pulse repetition frequency is equal to $1/t$, thus at a carrier frequency equal to twice the pulse repetition frequency, no signal information is being transmitted. By shifting the carrier frequency to this zero power density zone, a carrier information signal may be transmitted without affecting either the information content or bandwidth of the coded intelligence signals.

Although a cosine-squared pulse form has been chosen to illustrate the principle of zero power density at twice the pulse repetition frequency, it may be shown that a similar condition exists for other pulse forms, e.g. rectangular and isosceles-triangle pulses. Because no signal information is present at this frequency, the null may also be imposed by circuitry at the transmitter, for example, by placing a narrow band-elimination filter in the signal path.

At the receiver the carrier is resupplied by examining the pulse repetition rate, locking a local oscillator at twice the frequency thereof, and modulating the oscillator output with the carrier information signal received. This yields the exact carrier frequency originally used at the transmitter; however, the proper phase is also important if it is desired to prevent crosstalk between the multiplexed channels and to obtain a maximum output.

An understanding of the recovery of proper phase as taught herein requires appreciation of the effect of the phase error upon the recovered signals in each channel at the output of individual demodulators.

The multiplexed signal may be considered as $$A_1(t)\text{ sine }\omega t+A_2(t)\cos\omega t \qquad (1)$$

where $A_1(t)$=pulse train I as a function of time
$A_2(t)$=pulse train II as a function of time
$\omega=2\pi f$
$f$=carrier frequency In order to recover pulse trains I and II from the multiplexed signal received, the multiplexed signal is separately modulated in product modulators by the carrier frequency in proper phase relation. If the phase is incorrect, quadrature components form a portion of the modulator outputs and in the case of quadrature multiplexing these components constitute undesirable crosstalk.

Mathematically, the effect of demodulation by a resupplied carrier that is out of phase by angle $\theta$ may be appreciated by independently multiplying the multiplexed signal (1) by sin $(\omega t+\theta)$ and cos $(\omega t+\theta)$. Two separate signal outputs arise and may be expressed respectively as $$\frac{A_1(t)}{2}\cos\theta+\frac{A_2(t)}{2}\sin\theta+K_1 \qquad (2)$$

$$-\frac{A_1(t)}{2}\sin\theta+\frac{A_2(t)}{2}\cos\theta+K_2 \qquad (3)$$

where $K_1$ and $K_2$ represent all unwanted frequency components and are set equal to zero by appropriate filters.

If $A_1(t)$ is made equal to $A_2(t)$ $$A(t)\sin\theta=(2)-(3) \qquad (4)$$

$$\theta=\sin^{-1}\left[\frac{(2)-(3)}{A(t)}\right] \qquad (5)$$

where $A(t)$=the common amplitude of the input signals as a function of time.

The above expressions are illustrated graphically in FIGS. 2*a*, 2*b*, and 2*c*. Curve 20 in FIG. 2*a* represents Expression 2 as the sum of its two components, curves 21 and 22. Curve 23 in FIG. 2*b* represents Expression 3 as the sum of its two components, curves 24 and 25. Finally, curve 26 in FIG. 2*c* represents Equation 4, derived by subtracting curve 23 from curve 20. As illustrated by curve 26 for any particular phase deviation $\theta$, a definite error signal is produced upon subtraction of the outputs of the domodulators.

The equality $A_1(t)=A_2(t)$, assumed above, in order to achieve the above simple expression for phase error, is assured by simultaneously inserting equal signals in each channel at the transmitter. These equal signals may take the form of framing pulses similar to those presently employed in pulse-code transmission systems. To perform the operations of extracting the error signal, these pulses are gated into control circuitry at the repetition rate of their generation as explained hereinafter.

FIGS. 3 and 4 contain block diagrams of an embodiment of the invention, FIG. 3 illustrating a transmitter and FIG. 4 a portion of the receiver; the receiver portion being, for example, inserted at a point subsequent to the intermediate frequency amplifiers.

FIG. 3 illustrates one possible means for generating the multiplexed signal employed in the transmission system. The initial carrier frequency is developed in carrier oscillator 30 and pulse trains I and II are amplitude modulated upon this carrier in the well-known way by means of modulators 31 and 32. Distinctive reference or framing pulses are simultaneously applied in each channel by reference pulse generator 35 at a particular pulse repetition frequency. The output of modulator 31 is shifted 90 degrees in 90-degree phase shifter 36 and combined with the output of modulator 32 to yield a phase-quadrature multiplexed signal. In order to generate a discrete carrier information signal, oscillator 37, having a fixed frequency equal to twice the pulse repetition rate of the signals in channels 1 and 2, is used. The output of this oscillator modulates the carrier frequency via modulator 38, the output of which passes through band-pass filter 39 in order to produce a frequency exactly twice the pulse repetition rate removed from the carrier frequency. Each of these generated signals is then coupled in directional coupler 40 producing the multiplexed signal with carrier information described hereinbefore.

At the receiver, illustrated in FIG. 4, the input signal is received and processed in conventional fashion until intermediate frequency amplifier 41 is reached. At this point, band-pass filter 42 extracts the carrier information signal and applies it to product modulator 43. Oscillator 44 is nominally tuned to a frequency twice the pulse repetition rate of the pulse trains transmitted. The output of oscillator 44 is applied to product modulator 43 producing two basic frequency components, the true carrier, and the carrier removed by four times the pulse repetition rate. The output of product modulator 43 passes through filter 45 to eliminate unwanted components and pass only the true carrier frequency. The true carrier frequency is then applied to product modulators 46 and 47, the latter following a 90-degree phase shift in phase shifter 48. The application of the incoming signal to these product modulators will result in outputs corresponding to the original pulse trains transmitted, and in the event the carrier frequency is out of phase with the original carrier, crosstalk components will also appear as previously explained in conjunction with Expressions 2 and 3.

The outputs of product modulators 46 and 47 are applied to an adder 40 wherein the modulation component is extracted yielding an output having the repetition rate of the pulse trains. This output is applied to oscillator 44 in order to lock it to exactly twice the pulse repetition rate.

A second oscillator operating at the frequency of the reference pulses is used to extract the phase information required in order to insure proper phasing of the resupplied carrier. Thus, oscillator 49 provides a gating pulse at the repetition rate of the reference pulses. Upon concurrence of the demodulated reference pulses with these generated gating pulses, gates 50 and 51 will permit the reference pulses to pass on to adder 52 and subtractor 53. The function of adder 52, as was the case of analogous adder 40, is to extract the reference pulse repetition frequency in order to lock-in oscillator 49 to that frequency. Narrow band filter 54 prevents the intrusion of improper frequency components. As explained hereinbefore, the amplitudes of the reference pulses are compared in subtracter 53 and the difference thereof employed to control D.-C. amplifier 55 whose output in turn controls variable reactance 56. Variable reactance 56 is then employed in the well-known manner to adjust the phase of oscillator 44, so that it corresponds exactly with that of the original carrier.

As a refinement of the illustrated arrangement of components and in order to alleviate any phase error introduced in the receiver itself, a delay may be introduced in the signal branch at point 57. If this delay is made equal to that caused by filters 42 and 45, detuning of these filters will introduce negligible phase errors. Also, using a combination of a 45-degree phase lead and a 45-degree phase lag circuit in place of 90-degree phase shifter 48 would reduce the sensitivity of the receiver to a detuned inductance.

The above-described embodiment is one form which the present invention may assume. Other circuit arrangements may be developed in accordance with the teachings herein without departing from the spirit and scope of the invention.

What is claimed is:

1. In a system for transmitting plural pulse trains, transmitting and receiving stations, a source of carrier signals at said transmitting station, means for independently modulating said carrier signals by separate ones of said pulse trains to generate corresponding suppressed-carrier quadrature outputs, means for periodically introducing a reference pulse into each pulse train coincidentally, means for shifting a sample of said carrier signal by an amount equal to twice the pulse repetition frequency of the pulses in said trains, and means for transmitting both the frequency shifted carrier and the pulsed quadrature outputs, means at the receiving station for reception of the transmitted signals, an oscillator at said receiving station nominally tuned to twice the repetition frequency of said pulses in said pulse trains, means for modulating the received carrier sample with the output of said oscillator, means utilizing the recovered true carrier from the last means to demodulate said quadrature outputs independently to yield separate pulse train outputs and a combined output to control the frequency of said oscillator, means for sampling said pulse train outputs at the frequency of said reference pulses, and means employing a difference between the outputs of said sampling means to control the phase of said oscillator.

2. In a system for transmitting plural pulse trains, a transmitting and receiving station, a source of carrier signals at said transmitting station, means for independently modulating said carrier signals by separate ones of said pulse trains to generate corresponding suppressed-carrier quadrature outputs, means for identically pulsing said outputs at a predetermined frequency, means for shifting a sample of said carrier signal by an amount equal to twice the repetition frequency of the pulses in said trains, and means for transmitting both frequency shifted carrier and the pulsed quadrature outputs, means at the receiving station for reception of the transmitted signals, a local oscillator nominally tuned to the frequency employed to shift the transmitter, means for modulating the received carrier sample with the local oscillator output, means utilizing the recovered true carrier from the last means to demodulate said quadrature outputs independently to yield separate pulse train outputs and a combined output for control of said local oscillator, means for sampling said pulse train outputs at said predetermined frequency, and means employing the difference between the outputs of said sampling means to control the phase of said local oscillator.

3. In a system for multiplexing plural pulsed signals on to one suppressed carrier by maintaining said signals in phase quadrature: a transmitter comprising, a source of carrier frequency, means for modulating said carrier frequency with said plural pulsed signals to generate suppressed-carrier quadrature outputs, means for generating a discrete signal of frequency equal to said carrier frequency shifted by a multiple of the repetition frequency of said pulsed signals, means for transmitting said multiplexed signals and said discrete signal; a receiver for said transmitted signal comprising, an oscillator nominally tuned to said multiple of the repetition frequency of the pulsed signals, modulating means jointly responsive to said discrete signal and the output of said oscillator to produce a frequency substantially identical to said carrier frequency, means jointly responsive to said transmitted signal and said produced frequency to yield separate pulsed signal outputs, and means for combining said separate pulsed signal outputs, said oscillator being controlled by said combined outputs to accurately generate a frequency at said multiple of the pulse repetition rate of the pulsed signals, said modulating means thereupon producing a frequency identical to said carrier frequency.

4. A system as defined in claim 3 wherein said transmitter comprises means for coincidentally inserting reference signals into said pulsed signals at a predetermined frequency, and said receiver comprises means for sampling said pulsed signal outputs at said predetermined frequency and variable reactance means controlled by the difference between said sampled pulse signal outputs for controlling the phase of said oscillator.

5. In a receiver for suppressed-carrier signals having plural pulse trains quadrature multiplexed thereon and a discrete frequency component shifted from the carrier frequency by a multiple of the pulse repetition rate of said plural pulse trains, an oscillator nominally tuned to said multiple of the pulse repetition rate of said plural pulse trains, modulating means jointly responsive to said discrete frequency component and the output of said oscillator to recover a frequency substantially identical to the suppressed carrier, means jointly responsive to said recovered frequency and said signals to yield separate pulse train outputs, and means for combining said pulse train outputs controlling said oscillator to accurately generate a frequency at said multiple of the pulse repetition rate of said plural pulse trains, said modulating means thereupon producing a frequency identical to said carrier frequency.

6. In a pulse communication system, means for quadrature multiplexing plural pulse trains on a suppressed carrier, means for introducing reference signals into each said pulse train at a predetermined frequency prior to said multiplexing, demodulating means for individually extracting said pulse trains from said suppressed carrier, carrier resupply means for enabling said demodulating means, means for sampling said extracted pulse trains at said predetermined frequency, and means controlled by the difference between the samples from each pulse train for controlling the phase of said carrier resupply means.

7. A pulse communication system comprising, means for quadrature multiplexing plural pulse trains on a suppressed carrier, means for coincidentally inserting reference pulses into each said pulse train prior to said multiplexing, means for generating a discrete signal having a frequency shifted from the suppressed carrier by a multiple of the pulse repetition frequency, demodulating means for individually extracting said pulse trains from said suppressed carrier, an oscillator nominally tuned to said multiple of the pulse repetition frequency, means controlled by the output of said demodulating means for locking said oscillator at exactly said multiple of the pulse repetition frequency, sampling means for comparing the amplitudes of said reference pulses after demodulation, and means responsive to the difference between said amplitudes for altering the phase of said oscillator.

References Cited in the file of this patent

UNITED STATES PATENTS

| | | |
|---|---|---|
| 2,541,076 | Labin et al. | Feb. 13, 1951 |
| 2,708,268 | Toulon | May 10, 1955 |
| 2,843,658 | Christian | July 15, 1958 |
| 2,892,018 | Baugh | June 23, 1959 |